United States Patent
Landa et al.

(10) Patent No.: US 11,483,714 B2
(45) Date of Patent: Oct. 25, 2022

(54) INTELLIGENT SPECTRUM CONTROL METHODS AND SYSTEMS

(71) Applicant: Raytheon Company, Waltham, MA (US)

(72) Inventors: Bradley Landa, Fort Wayne, IN (US); Brian C. Rieman, Grabill, IN (US); Joshua E. Walworth, Fort Wayne, IN (US); Brendan R. Bougher, Fort Wayne, IN (US); Laurence B. Finger, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/358,911

(22) Filed: Mar. 20, 2019

(65) Prior Publication Data

US 2020/0305003 A1 Sep. 24, 2020

(51) Int. Cl.
*H04W 16/14* (2009.01)
*H01Q 21/28* (2006.01)
(Continued)

(52) U.S. Cl.
CPC ........... *H04W 16/14* (2013.01); *G01S 19/015* (2013.01); *H01Q 21/28* (2013.01); *H04B 3/52* (2013.01);
(Continued)

(58) Field of Classification Search
CPC ..... H04W 16/14; H04W 4/029; H04W 16/10; H04W 72/0453; H04W 64/003;
(Continued)

(56) References Cited

U.S. PATENT DOCUMENTS 3,648,287 A * 3/1972 Lind .................. G01S 7/36
342/18
5,214,788 A 5/1993 Delaperriere et al.
(Continued)

FOREIGN PATENT DOCUMENTS

WO WO-2008102406 A2 * 8/2008 ............. H01Q 21/26
WO WO 2011/156029 12/2011

OTHER PUBLICATIONS

International Search Report and Written Opinion of the ISA dated Dec. 18, 2020 for International Application No. PCT/US2020/020077; 6 Pages.
(Continued)

*Primary Examiner* — Ayaz R Sheikh
*Assistant Examiner* — Tarell A Hampton
(74) *Attorney, Agent, or Firm* — Daly, Crowley, Mofford & Durkee, LLP

(57) ABSTRACT

Embodiments of the present disclosure relate to a spectrum control system. The system comprises one or more high frequency (HF) antennas, one or more multi-band (MB) antennas, and one or more datalinks. A spectrum management processor is configured to receive signals from the one or more HF and MB antennas and the one or more datalinks, and switch to one or more alternate radio-frequency (RF) channels for communications and/or position, navigation, and timing (PNT) information in response to a failure in a current communication channel and/or a global positioning system (GPS) signal.

18 Claims, 7 Drawing Sheets

(51) Int. Cl.

| | | |
|---|---|---|
| | *H04B 3/52* | (2006.01) |
| | *H04W 72/04* | (2009.01) |
| | *G01S 19/01* | (2010.01) |
| | *H04W 64/00* | (2009.01) |
| | *H04W 4/029* | (2018.01) |
| | *H04W 16/10* | (2009.01) |
| | *H04W 88/06* | (2009.01) |

(52) U.S. Cl.
CPC ............ *H04W 4/029* (2018.02); *H04W 16/10* (2013.01); *H04W 64/003* (2013.01); *H04W 72/0453* (2013.01); *H04W 88/06* (2013.01)

(58) Field of Classification Search
CPC ........ H04W 88/06; G01S 19/015; H04B 3/52; H01Q 21/28
See application file for complete search history.

(56) References Cited

U.S. PATENT DOCUMENTS

| | | | |
|---|---|---|---|
| 7,107,015 B2 | 9/2006 | Stepp et al. | |
| 8,254,481 B1* | 8/2012 | McCloskey | H04K 1/04 |
| | | | 375/260 |
| 8,849,209 B2 | 9/2014 | Nieto et al. | |
| 9,838,882 B1* | 12/2017 | Yankevich | H04K 3/226 |
| 2002/0053989 A1 | 5/2002 | Lin et al. | |
| 2002/0177944 A1* | 11/2002 | Ihara | G01C 21/36 |
| | | | 701/468 |
| 2005/0190782 A1* | 9/2005 | Buckley | H04W 36/12 |
| | | | 370/437 |
| 2005/0232579 A1* | 10/2005 | Monroe | H04N 5/782 |
| | | | 386/225 |
| 2007/0066261 A1* | 3/2007 | Haralabidis | H04B 1/406 |
| | | | 455/255 |
| 2011/0151795 A1 | 6/2011 | D'Avello et al. | |
| 2015/0070216 A1* | 3/2015 | Alexopoulos | H01Q 9/14 |
| | | | 342/368 |
| 2018/0300709 A1* | 10/2018 | Singhai | G06Q 20/123 |
| 2020/0153535 A1* | 5/2020 | Jayaweera Kankanamge | |
| | | | G06N 3/006 |

OTHER PUBLICATIONS

Written Opinion of the ISA dated Dec. 18, 2020 for International Application No. PCT/US2020/020077; 8 Pages.

PCT International Preliminary Report dated Sep. 30, 2021 for International Application No. PCT/US2020/020077; 8 Pages.

* cited by examiner

INTELLIGENT SPECTRUM CONTROL METHODS AND SYSTEMS

BACKGROUND

Legacy military radio systems generally operate within the very high frequency (VHF) and/or ultra-high frequency (UHF) bands. VHF bands range between 49 MHz and 216 MHz, while UHF bands range between 450 MHz and 952 MHz. Additionally, legacy military systems utilize the Global Positioning System (GPS), a satellite-based radio navigation system, for geolocation and time information. Such legacy military radio and/or GPS systems are susceptible to jamming of radio and/or GPS signals. Jamming of those signals occur to disrupt control of a battle because it can eliminate communications and can render navigation difficult.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

Embodiments of the present disclosure relate to spectrum management methods and systems. The methods and systems provide a spectrum management solution due to a loss of navigation when global positioning system (GPS) is disrupted and jamming of legacy VHF/UHF bands results in a loss of communication.

In embodiments, an applique is configured to be attached to a legacy radio system. The applique comprises circuitry configured to provide alternative position, navigation, and timing (ALT-PNT) and communication channels in a contested area where GPS and VHF/UHF communication bands are disrupted. Advantageously, the applique provides a low-cost upgrade to existing legacy radios as opposed to requiring a customer to upgrade an entire radio system.

One aspect of the present disclosure relates to a spectrum control system that comprises one or more high frequency (HF) antennas, one or more multi-band (MB) antennas, one or more datalinks, and a spectrum management processor. The spectrum management processor is configured to receive signals from the one or more HF and MB antennas and the one or more datalinks, and switch to one or more alternate radio-frequency (RF) channels for communications and/or position, navigation, and timing (PNT) information in response to a failure in a current communication channel and/or a global positioning system (GPS) signal.

In embodiments, the spectrum management processor can be further configured to process incoming RF signals from the HF antenna and/or the MB antenna and shift a frequency of the current communication channel to the one or more alternate channels based on receiving a frequency shift indicator from the processed incoming RF signals.

In additional embodiments, the one or more MB antennas can be configured to scan a radio-frequency (RF) environment. Accordingly, the spectrum management processor can be further configured to determine available RF communication channels based on results of the scan. A data store can be configured to store a spectrum availability table including a list of the available RF communication channels.

In other embodiments, the spectrum management processor can be further configured to detect if a communication channel is being jammed based on the results of the scan of the RF environment. In response to detecting a jam, the spectrum management processor can be configured to select at least one of the one or more alternate RF channels from the spectrum availability table, broadcast a frequency shift notification based on the selected one or more alternate RF channels, and switch to the one or more alternate radio-frequency (RF) channels for communications and/or position, navigation, and timing (PNT) information.

In embodiments, the frequency shift notification can be a delta frequency value that is a difference between the selected one or more alternate RF channels and the current communication channel.

In further embodiments, the one or more datalinks can be configured to couple to and receive GPS signals from a platform computer. Accordingly, the spectrum management processor can be further configured to determine a failure in the GPS signal, wherein a failure includes one or more of: a weak GPS signal, a lost GPS signal, or a jammed GPS signal, select an RF network to receive PNT information, wherein selecting the RF network comprises connecting to the RF network via one or more of the available RF communication channels, and provide PNT information to the platform computer. The spectrum management processor can also be configured to compute PNT information of the platform computer using the PNT information received from the RF network.

Another aspect relates to method. The method comprises receiving radio frequency (RF) signals from one or more high frequency (HF) antennas and/or one or more multi-band (MB) antennas and switching to one or more alternate radio-frequency (RF) channels for communications and/or position, navigation, and timing (PNT) information in response to a failure in a current communication channel and/or a global positioning system (GPS) signal.

In embodiments, the method can further comprise processing incoming RF signals from the HF antennas and/or the MB antennas and shifting a frequency of the current communication channel to the one or more alternate channels based on receiving a frequency shift indicator from the processed incoming RF signals.

The method can also include controlling the one or more HR antennas and/or the MB antennas to scan a radio-frequency (RF) environment and determining available RF communication channels based on results of the scan. The method can further comprise storing, in a datastore, a spectrum availability table including a list of the available RF communication channels.

Additionally, the method can comprise detecting if a communication channel is being jammed based on the results of the scan of the RF environment. In response to detecting a jam, the method can comprise selecting at least one of the one or more alternate RF channels from the spectrum availability table, broadcasting a frequency shift notification based on the selected one or more alternate RF channels, and switching to the one or more alternate radio-frequency (RF) channels for communications and/or position, navigation, and timing (PNT) information. In embodiments, the frequency shift notification is a delta frequency value that can be a difference between the selected one or more alternate RF channels and the current communication channel.

Further, the method can comprise receiving GPS signals via a datalink coupled to a platform computer. Accordingly, the method can also comprise determining a failure in the GPS signal, wherein a failure includes one or more of: a weak GPS signal, a lost GPS signal, or a jammed GPS signal, selecting an RF network to receive PNT information, wherein selecting the RF network comprises connecting to the RF network via one or more of the available RF communication channels, and providing PNT information to the platform computer. In other embodiments, the method can comprise computing PNT information of the platform computer using the PNT information received from the RF network.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
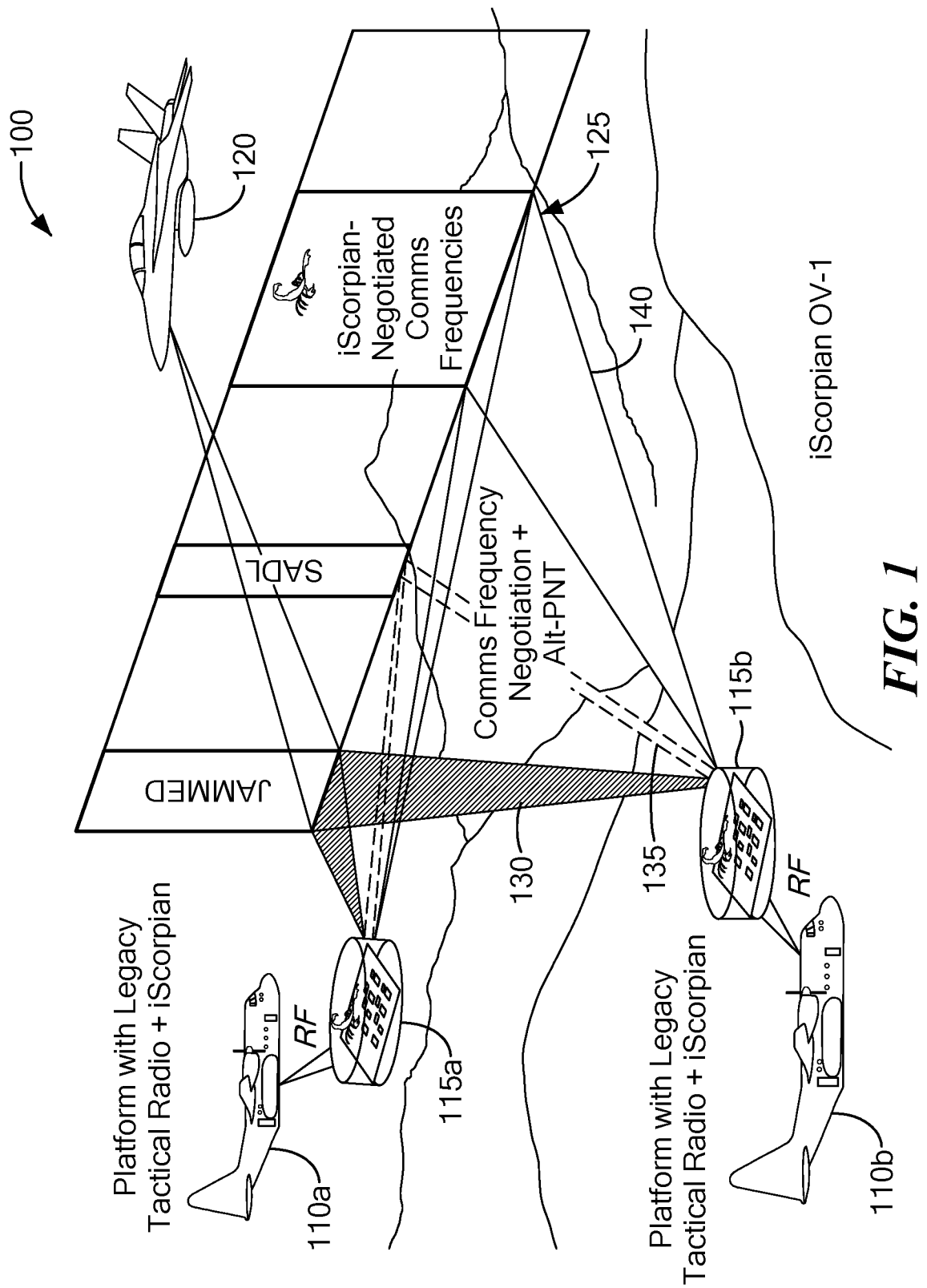
FIG. 1 illustrates an example operational environment for an intelligent spectrum control system according to embodiments described herein.

Regarding FIG. 1, platforms such as vehicles 110a-b can send and receive communication signals and receive geolocation and timing signals via one or more bands of the radio frequency (RF) spectrum 125. Although vehicles 110a-b are illustrated as aerial vehicles, a skilled artisan understands that embodiments disclosed herein apply to any land, sea, and/or air-based vehicles.

The vehicles 110a-b may only be equipped with legacy radio systems (e.g., legacy radio system 200 of FIG. 2) that are only configured to operate on very high frequency (VHF) and/or ultra-high frequency (UHF) bands of the RF spectrum 125. Additionally, vehicles 110a-b may only be equipped with global positioning system (GPS) receivers to receive geolocation and timing signals from a GPS system.

In embodiments, the aerial vehicles 110a-b can communicate with each other and/or other entities using legacy communication and GPS bands 130. The aerial vehicles may enter an area 100 such as a contested and/or hostile territory in which an enemy entity 120 can jam the legacy communication and GPS bands 130. In other embodiments, operations over the legacy communication and GPS bands 130 can fail due to weak signaling, interference, and any other signaling issues that disrupt and/or interrupt communications over the legacy communication and GPS bands 130.

In such circumstances, appliques 115a-b can be attached to legacy radio and GPS systems (not shown) of the aerial vehicles 110a-b to provide spectrum management functionality in response to a disruption of the legacy communication and GPS bands 130. For example, the appliques 115a-b, as discussed in greater detail with respect to FIG. 3, can comprise circuitry configured to provide alternative communication channels and position, navigation, and timing (ALT-PNT) in the contested area 100 when the legacy communication and GPS bands 130 are disrupted. For instance, the appliques 115a-b can be configured to provide ALT-PNT via a PNT band 135. In embodiments, the PNT band 135 can be a situational awareness datalink (SADL) network or any other network operable to transmit PNT information. Additionally, the appliques 115a-b can enable the vehicles to communicate over a non-legacy communication band 140. The non-legacy communication band 140 can correspond to any frequency outside the VHF/UHF frequency bands such as short-wave frequency bands (S-band).

Figure 2:
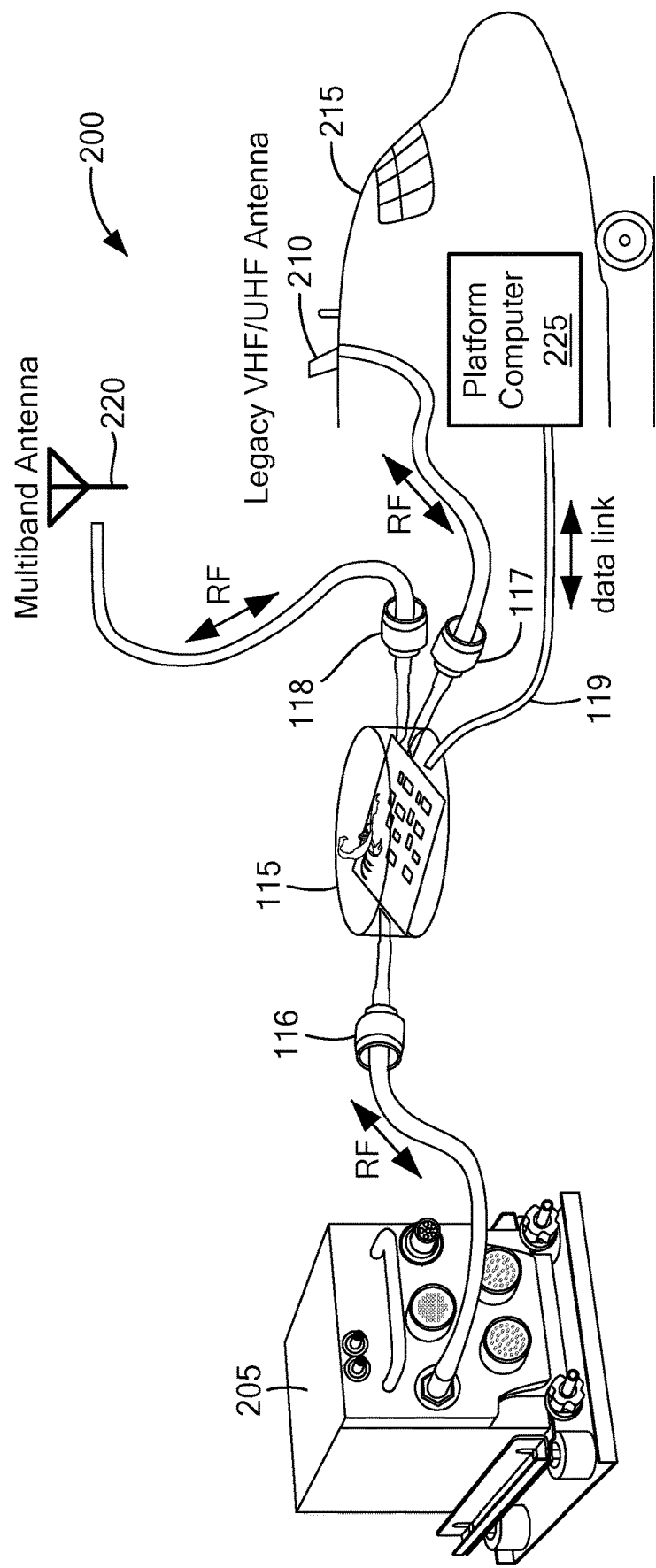
FIG. 2 is a block diagram of a spectrum control system according embodiments described herein.

Regarding FIG. 2, in which like elements are provided having like reference designations, a vehicle 215 includes a legacy radio system 200 that comprises a legacy radio 205 and a legacy VHF/UHF antenna 210. An applique 115 is configured to connect, in-line, between the legacy radio 205 and the legacy VHF/UHF antenna 210 via first and second legacy RF connectors 116, 117. The first legacy RF connector 116 interfaces with the legacy radio 205, while the second legacy RF connector 117 interfaces with the legacy VHF/UHF antenna 210. In response to a failure in legacy communication and GPS bands (e.g., the legacy communication and GPS bands 130 of FIG. 1), the applique 115 is configured to provide intelligent spectrum management and dynamically hop to available spectrum channels for communications and PNT information. As stated herein, a failure in the legacy communication and GPS bands can arise to jamming, weak signal, interference, and any other signaling issues that disrupt and/or interrupt communications over the legacy communication and GPS bands.

In embodiments, the applique 115 can include a multi-band (MB) RF connector 118 that is coupled to an MB antenna 220 that is affixed to the vehicle 215. The applique 115 and MB antenna 220 are configured to enable the legacy radio 205 to communicate over bands outside the VHF/UHF bands for communications and ALT-PNT. For example, the MB antenna 220 can be configured to scan and provide RF communications over bands outside the VHF/UHF bands. Additionally, the applique 115 can include circuitry, as described in further detail herein, configured to enable the legacy radio 205 to communicate over those bands outside the VHF/UHF bands.

Further, the applique 115 can comprise a datalink 119 configured to communicatively couple to a platform computer 225 of the aerial vehicle 215. The applique 115 can obtain PNT information from, e.g., a SADL network, as discussed in greater detail herein, in response to a disruption in GPS communications. The datalink 119 enables the applique 115 to provide the PNT information to the platform computer 225 which is configured to process the PNT information and determine a location of the aerial vehicle 215.

Figure 3:
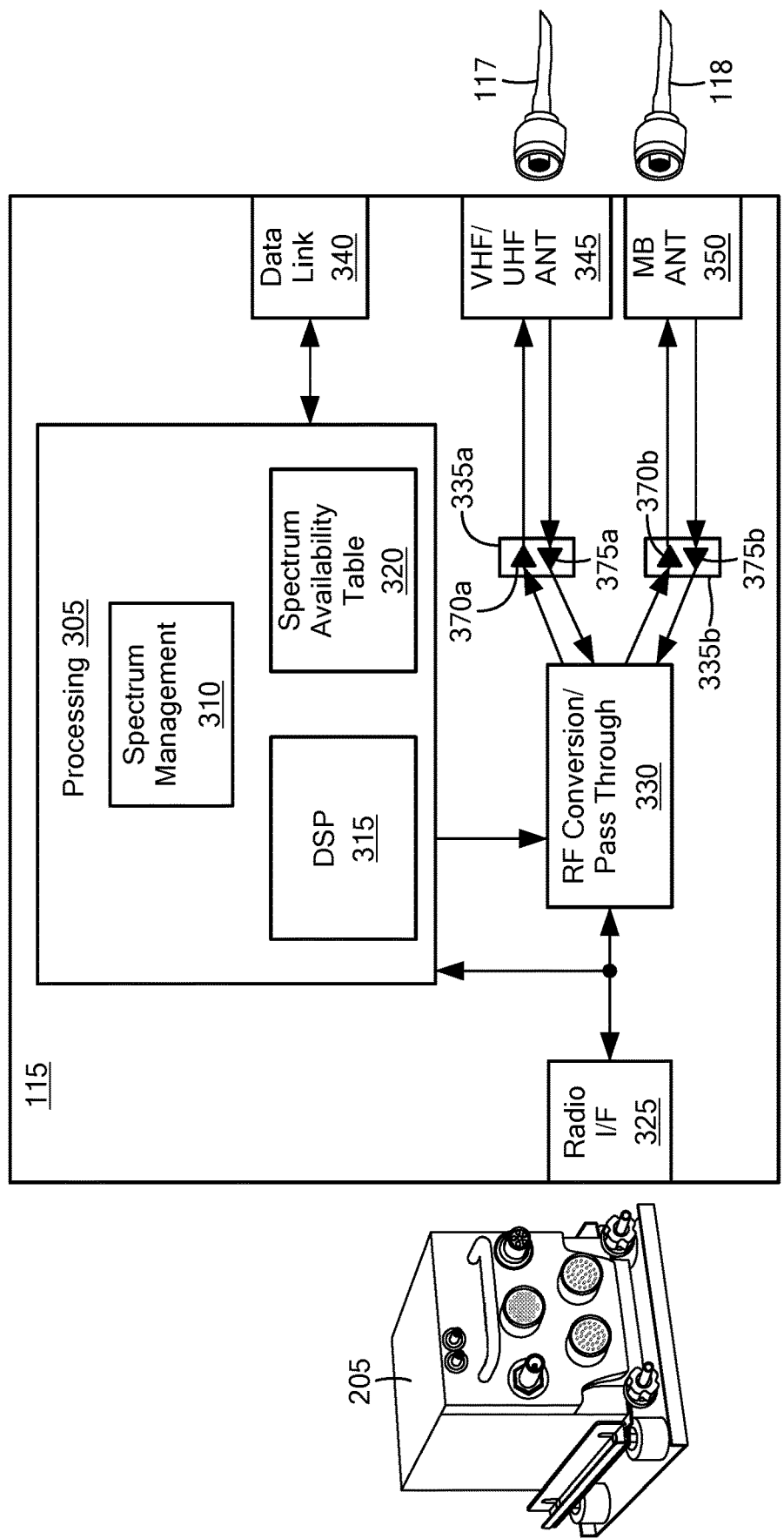
FIG. 3 is a block diagram of a spectrum control device according embodiments described herein.

Regarding FIG. 3, in which like elements are provided having like reference designations, an applique 115 is connected to and between a legacy radio 205 via radio interface 325 and radio and platform computing systems of a vehicle (e.g., VHF/UHF antenna 210, MB antenna 220, platform computer 225, and aerial vehicle 215 of FIG. 2) via ports 340 345, 350.

In embodiments, the applique 115 includes a spectrum management processor 305 that comprises a spectrum management controller 310 configured to control spectrum utilization for communications and navigation for the vehicle. The spectrum management controller 310 can scan a radio frequency (RF) environment using the VHF/UHF and MB antennas 210, 220 coupled to the applique 115 via VHF/UHF and MB antenna ports 345, 350 and respective connectors 117, 118. For example, the spectrum management controller 310 scans the RF environment by identifying RF energy levels from a plurality of frequency bands using the digital signal processor 315. Based on the power levels, the controller 310 identifies frequency bands available for communication and PNT signaling. In other examples, the controller 310 can scan the RF environment by examining data being received in a given frequency band and identifying unexpected data or other abnormalities which may indicate that the band is being tactfully spoofed rather than jammed using sheer RF power. Based on the scan, the controller 310 generates and stores a spectrum availability table in memory 320.

In some embodiments, the spectrum management controller 310 scans the RF environment based on a pre-defined schedule. The pre-defined schedule can be based on a periodic or intermittent timing schedule. In other examples, the controller 310 can scan the RF environment based on a trigger event. The trigger event can be a detection of a jam, interference, or any other disturbance to an RF band.

In operation, the radio 205 can communicate with other radios (e.g., of another vehicle) according to a pre-defined frequency hopping schedule and/or algorithm over legacy RF bands such as the VHF/UHF bands. The pre-defined frequency hopping scheduled is determined according to any known or yet to be known technique. Accordingly, the radio 205 transmits RF signals according to the pre-defined frequency hopping schedule, which the applique 115 receives via radio interface 325.

If the RF environment scan has not detected a failure in the legacy RF band, an RF conversion/pass through processor 330 allows the RF signals to pass through, un-modified, to a first RF transceiver 335a coupled to the legacy RF port 345. The first transceiver 335a comprises a first power amplifier (PA) 370a that amplifies the transmitted RF signals which are propagated into the RF environment by legacy antenna (e.g., the VHF/UHF antenna 210 of FIG. 2) coupled to the legacy RF port 345 via the connector 117. Additionally, RF signals received via the legacy RF port 345 are received by the first transceiver 335a which are processed by a first low noise amplifier (LNA) 375a. The RF conversion/pass through processor 330 allows that received RF signals to pass thorough, un-modified, to the radio 205.

If the RF environment scan has detected a failure in the legacy RF band, the spectrum management controller 310 performs a look-up in the spectrum availability table stored in the memory 320 to identify one or more frequency bands available for communications (e.g., those bands that do not have a detected failure). The spectrum management controller 310 selects one or more of the available frequency bands and generates a shift frequency signal which is provided to the RF conversion/pass through processor 330 and transmitted to other radios via the datalink port 340 and/or the MB antenna port 350. Accordingly, the shift frequency signal comprises a frequency offset based on a difference between the selected available frequency band and the legacy RF band currently being used by the radios.

When transmitting communication signals, the RF conversion/pass through processor 330 applies the shift frequency signal to legacy RF signals transmitted by a legacy radio, e.g., the radio 205. For example, the RF conversion/pass through processor 330 shifts the transmitted legacy RF signals by the frequency offset using the shift frequency signal to generate converted RF signals. As such, the converted RF signals correspond to the available frequency bands selected by the controller 310. A second transceiver 335b receives the converted RF signals which are processed by the second PA 370b and transmitted via a MB antenna coupled to the MB antenna port 350 via MB connector 118. Advantageously, the applique 115 enables existing radios to utilize their pre-defined frequency hopping schedules and/or algorithms in response to a failure in a legacy RF band.

The second transceiver 335b comprises a second LNA 375b that processes converted RF signals received from other radios. The RF conversion/pass through processor 330 receives the second LNA processed signals and converts those signals to the legacy RF band for use by radio 205. Accordingly, the radio 205 does not require any modification and the applique seamlessly extends the communication capability of the radio 205.

Figure 4:
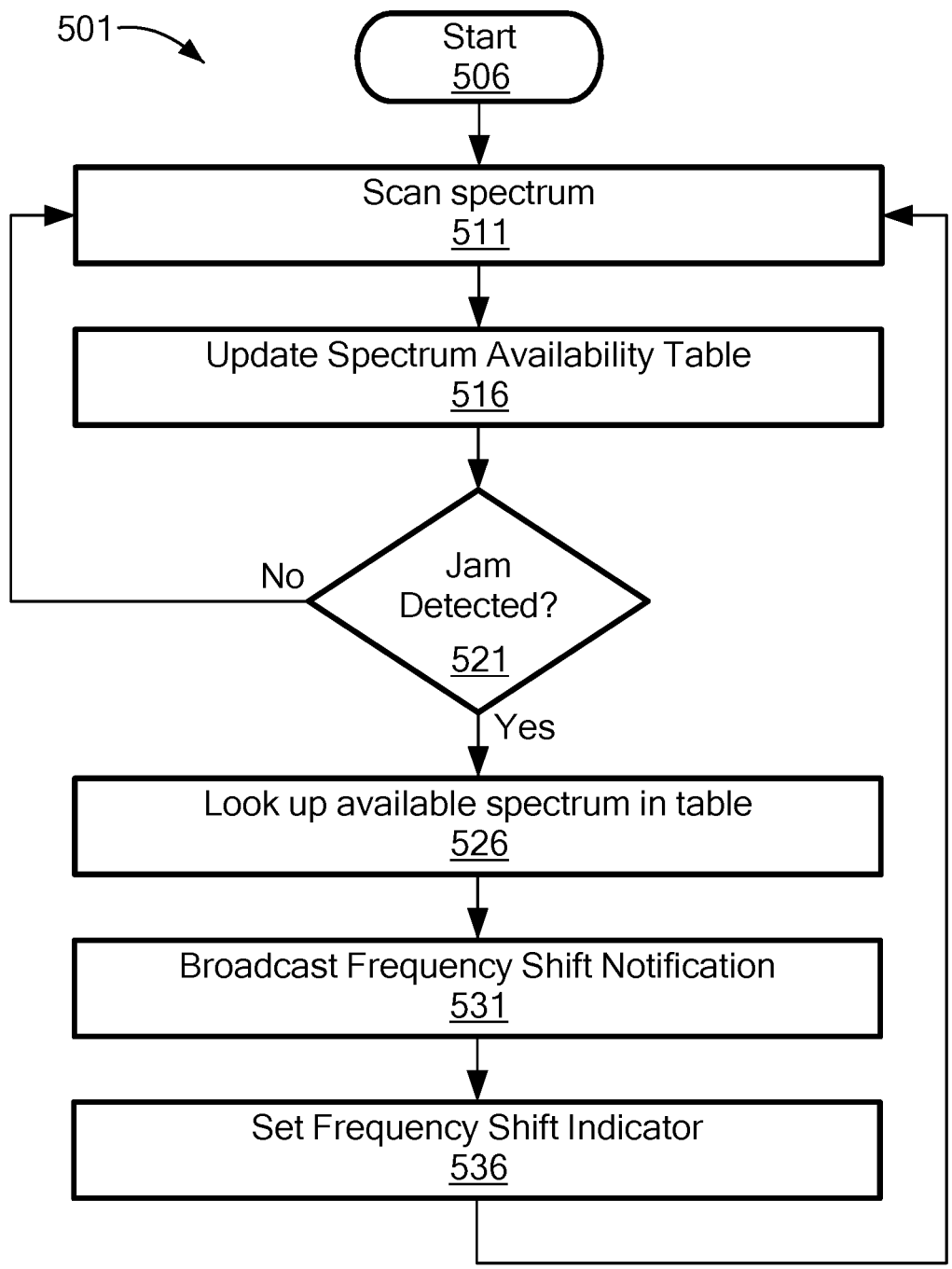
FIGS. 4, 4A and 4B are flow diagrams of example methods for intelligent spectrum control according to embodiments described herein.

Regarding FIG. 4, a method 501 begins at 506. The method 501, at 511, includes scanning an RF environment to determine a status and availability of frequency bands available for communication and/or PNT signaling. For example, a spectrum management controller (e.g., the controller 310 comprised by the applique 115 of FIG. 3) can scan a radio frequency (RF) environment via the VHF/UHF and MB antennas (e.g., the antennas 210, 220 of FIG. 2). The method 501, at 516, includes generating and storing a spectrum availability table in memory (e.g., the memory 320 of FIG. 3) based on results of the scan. The method 501, at 521, includes determining whether a failure in RF channels currently being used for communications and PNT information (e.g., GPS information) exists. A failure can include events such as jamming, weak signal, interference, and any other signaling issues that disrupt and/or interrupt communications existing RF communication channels. For example, the controller can measure RF power levels to determine the existence of a failure and/or to determine RF channels available for communications and PNT signaling.

If a failure is not detected, the method 501 includes continuing to scan the RF environment, at 511, and updating the spectrum availability table, at 516. Additionally, the method 501 includes continuing communications over the RF channels currently being used for communications and PNT information. In response to detecting a failure, the method 501, at 526, includes performing a look-up in the spectrum availability table stored in the memory to identify one or more frequency bands available for communications (e.g., those bands that do not have a detected failure). For example, the controller selects one or more of the available frequency bands and generates a shift frequency signal. In other embodiments, the look-up can include determining if a frequency shift indicator has been received, e.g., according to the method 502 of FIG. 4A.

At 531, the method 501 includes broadcasting a frequency shift indication. In embodiments, the frequency shift indication can be broadcast on a frequency determined by a pre-determined algorithm such as a frequency hopping algorithm. In other embodiments, the frequency could be based on time of day, day of the month, geographical position, military unit of organization, etc. In further embodiments, the frequency can be a fixed pre-determined frequency.

The frequency shift indication can include a frequency offset based on a difference between the selected available frequency band and the RF band currently being used. Accordingly, the broadcast notifies radios in a communication network of the adjustment such that they can adjust their communication channels to continue operations despite the detected failure. Additionally, the method 501, at 536, include setting a set frequency shift indicator to control RF communications of a connected radio (e.g., the radio 205) communicatively coupled to the controller as discussed in greater detail with respect to FIG. 3 and FIG. 4B. The method 501 includes, at 511, includes continuing to scan the RF environment and updating the spectrum availability table at 516.

Figure 4A:
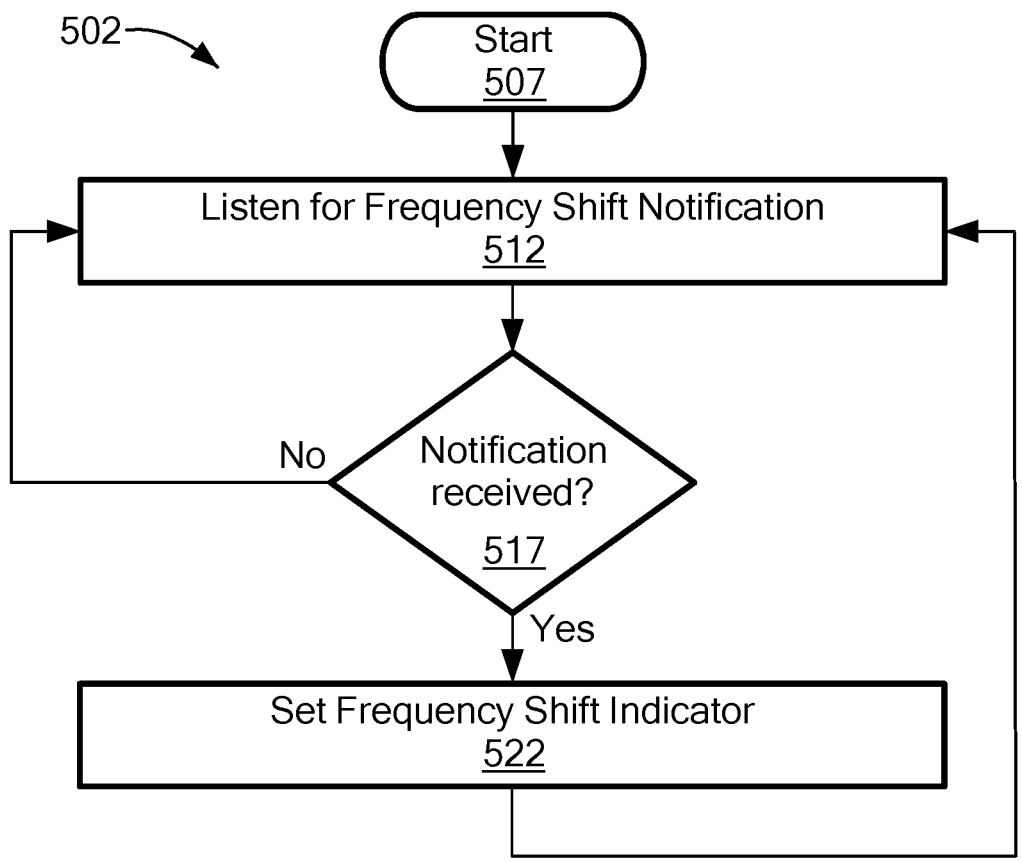

Regarding FIG. 4A, a method 502, at 507, begins. In embodiments, the method 502 can begin in response to detecting a failure according to the method 501 of FIG. 4. The method 502, at 512, includes listening for a frequency shift notification. In embodiments, the method 502 can include determining which frequencies to listen according to step 531 of method 501. The method 502, at 517, includes determining if a notification has been received. If a notification has not been received, the method 502, at 512, includes continuing to listen for a frequency shift notification. If a notification has been received, the method 502, at 522, includes setting a frequency shift indicator to control RF communications of a connected radio (e.g., the radio 205) communicatively coupled to the controller as discussed in greater detail with respect to FIG. 3 and FIG. 4B.

Figure 4B:
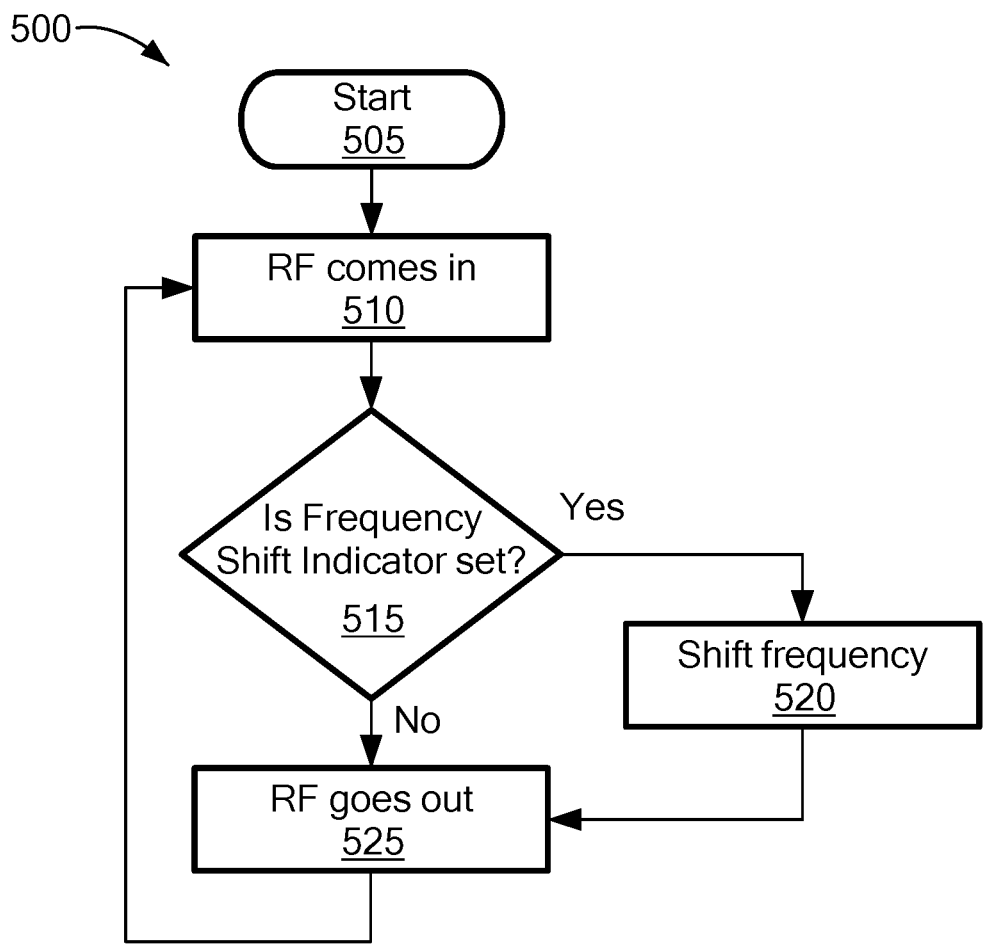

Regarding FIG. 4B, a method 500 begins at 505. The method 502, at 510, includes receiving an RF signal at an applique comprising a spectrum management processor (e.g., the applique and processor 115, 305 of FIG. 3). The RF signal can be received from a radio directly coupled to the applique (e.g., the radio 205 of FIG. 3) or from an external source via one or more antenna ports of the applique (e.g., ports 345, 350 of FIG. 3). The method 500, at 515, in response to receiving the RF signal determines if a frequency shift indicator is set. If no indicator is set, the method 500, at 525, allows the RF signal pass through the applique without any modification. If a frequency shift indicator is set, the method 500, at 520, shifts the RF signal by a frequency offset provided by the indicator.

In embodiments where the RF signal is received from the radio directly coupled to the applique, an RF conversion/pass through processor of the applique (e.g., the processor 330 of FIG. 3) applies a shift frequency signal to the RF signals received from the radio. For example, the RF conversion/pass through processor shifts the received RF signals by the frequency offset using the shift frequency signal to generate converted RF signals for transmission to external radios (e.g., radios not directly coupled to the applique).

In embodiments where the RF signal is received from an external source, converts those signals to a legacy RF band for use by radio directly coupled to the applique. Accordingly, the radio does not require any modification and the applique seamlessly extends the communication capability of the radio.

Figure 5:
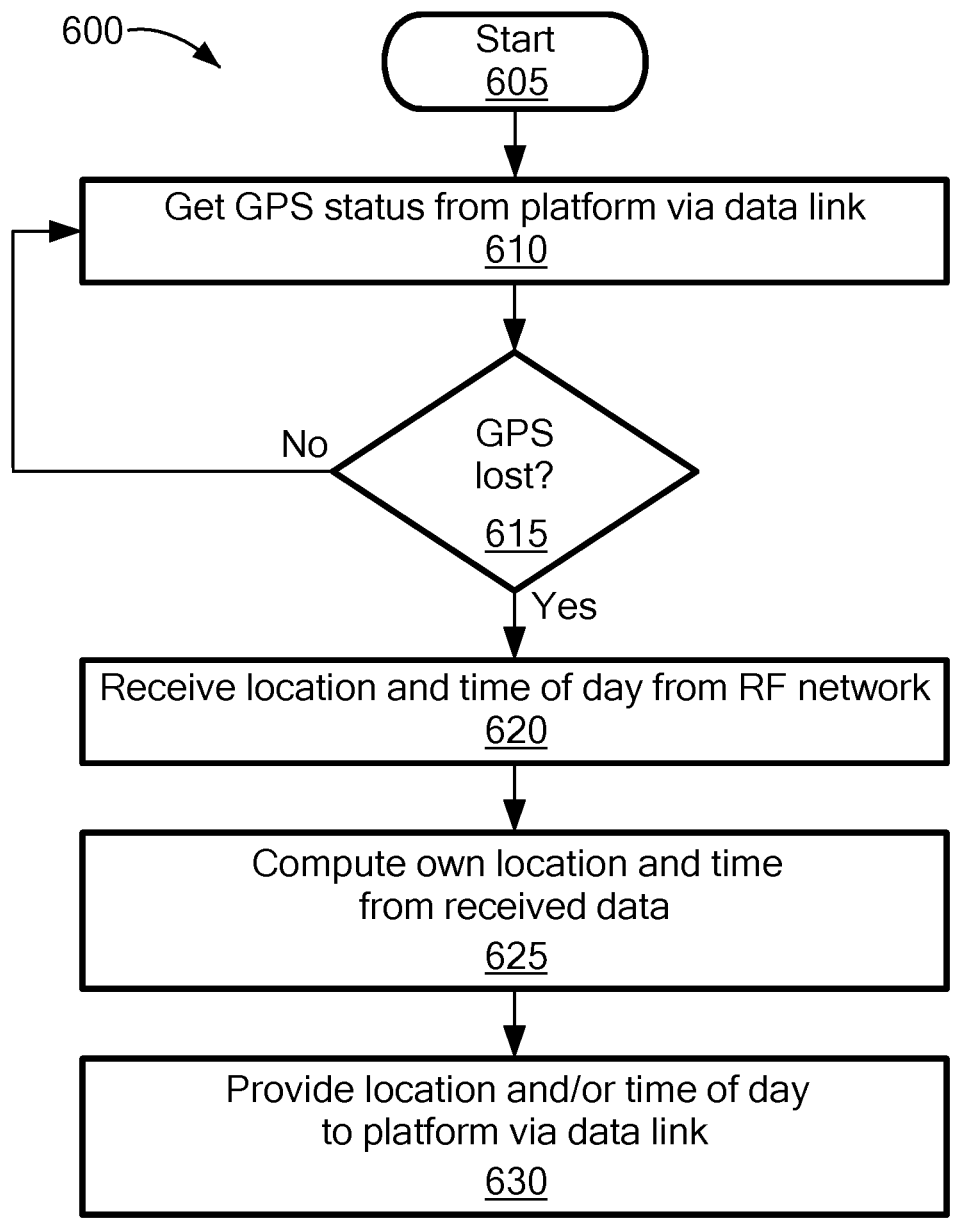
FIG. 5 is a flow diagram of an example method for obtaining position, navigation, and timing (PNT) information according to embodiments described herein.

Regarding FIG. 5, a method 600 begins at 605. The method 600, at 600, includes obtaining a GPS status, by an applique from a platform computer via a datalink (e.g., the applique 115, platform computer 225, and datalink 340,119 of FIGS. 2 and 3). The method 600, at 615, includes determining by the applique's spectrum management processor (e.g., the processor 305) if the GPS signal is lost. If the GPS signal is not lost, the method 600, at 610, includes continues to obtain a GPS status from the platform computer. If the GPS signal is lost, the method 600, at 620, includes receiving PNT information from an alternative RE network configured to provide PNT information. For example, the method 600, at 610, can determine available RF networks for receiving PNT using the method 501 of FIG. 4. Based on the PNT information, the method 600, at 625, can compute a location of a platform (e.g., the platform 215 of FIG. 2) and time. The method 600, at 630, can then provide the computed location and time to the platform computer via the datalink.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the embodiments described herein by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. A spectrum control system comprising:
   one or more high frequency (HF) antennas selectively coupled to a radio via a first transceiver;
   one or more multi-band (MB) antennas selectively coupled to the radio via a second transceiver, the radio operating in one or more legacy radio-frequency (RF) channels;
   one or more datalinks; and
   a spectrum management processor configured to:
   receive signals from the one or more HF antennas via the first transceiver, the one or more MB antennas via the second transceiver, and the one or more datalinks, and
   switch to one or more alternate radio-frequency (RF) channels different from the one or more legacy RF channels for communications and/or position, navigation, and timing (PNT) information in response to a failure in a current communication channel and/or a global positioning system (GPS) signal.

2. The system of claim 1, wherein the spectrum management processor is further configured to:
   process incoming RF signals from the HF antennas and/or the MB antennas; and
   shift a frequency of the current communication channel to the one or more alternate channels based on receiving a frequency shift indicator from the processed incoming RF signals.

3. The system of claim 1, wherein:
   the one or more MB antennas are configured to scan a radio-frequency (RF) environment; and
   the spectrum management processor is further configured to determine available RF communication channels based on results of the scan.

4. The system of claim 3 further comprising a data store configured to store a spectrum availability table including a list of the available RF communication channels.

5. The system of claim 4, wherein the spectrum management processor is further configured to detect if a communication channel is being jammed based on the results of the scan of the RF environment.

6. The system of claim 5, wherein in response to detecting a jam, the spectrum management processor is further configured to:
   select the one or more alternate RF channels from the spectrum availability table;
   broadcast a frequency shift notification based on the selected one or more alternate RF channels; and
   switch to the one or more alternate radio-frequency (RF) channels for communications and/or position, navigation, and timing (PNT) information.

7. The system of claim 6, wherein the frequency shift notification is a delta frequency value that is a difference between the selected one or more alternate RF channels and the current communication channel.

8. The system of claim 4, wherein the one or more datalinks are configured to couple to and receive GPS signals from a platform computer.

9. The system of claim 8, wherein the spectrum management processor is further configured to:
   determine a failure in the GPS signal, wherein a failure includes one or more of: a weak GPS signal, a lost GPS signal, or a jammed GPS signal;
   select an RF network to receive PNT information, wherein selecting the RF network comprises connecting to the RF network via one or more of the available RF communication channels; and provide PNT information to the platform computer.

10. The system of claim 9, wherein the spectrum management processor is further configured to compute PNT information of the platform computer using the PNT information received from the RF network.

11. A method comprising:

receiving radio frequency (RF) signals from one or more high frequency (HF) antennas and from one or more multi-band (MB) antennas;

receiving GPS signals via a datalink coupled to a platform computer; and in response to a failure in a current communication channel and/or a global positioning system (GPS) signal:

controlling the one or more HF antennas and/or the one or more MB antennas to scan an RF environment;

storing, in a datastore, a spectrum availability table including a list of the available RF communication channels;

determining available RF communication channels based on results of the scan;

selecting one or more alternate RF channels from among the determined available RF communication channels;

broadcasting a frequency shift notification based on the selected one or more alternate RF channels; and switching to the one or more alternate RF channels for communications and/or position, navigation, and timing (PNT) information.

12. The method of claim 11 further comprising:

processing incoming RF signals from the HF antennas and/or the MB antennas; and shifting a frequency of the current communication channel to the one or more alternate channels based on receiving a frequency shift indicator from the processed incoming RF signals.

13. The method of claim 11 further comprising detecting if a communication channel is being jammed based on the results of the scan of the RF environment.

14. The method of claim 13, wherein switching to the one or more alternate RF channels is in response to detecting a jam.

15. The method of claim 14, wherein the frequency shift notification is a delta frequency value that is a difference between the selected one or more alternate RF channels and the current communication channel.

16. The method of claim 11 further comprising:

determining a failure in the GPS signal, wherein a failure includes one or more of: a weak GPS signal, a lost GPS signal, or a jammed GPS signal;

selecting an RF network to receive PNT information, wherein selecting the RF network comprises connecting to the RF network via one or more of the available RF communication channels; and providing PNT information to the platform computer.

17. The method of claim 16 further comprising computing PNT information of the platform computer using the PNT information received from the RF network.

18. A method comprising:

receiving radio frequency (RF) signals from one or more high frequency (HF) antennas and from one or more multi-band (MB) antennas;

receiving GPS signals via a datalink coupled to a platform computer;

determining a failure in the GPS signal, wherein a failure includes one or more of: a weak GPS signal, a lost GPS signal, or a jammed GPS signal; and responsive to the determination of the failure:

controlling the one or more HF antennas and/or the one or more MB antennas to scan an RF environment;

determining available RF communication channels based on results of the scan;

selecting an RF network to receive PNT information, wherein selecting the RF network comprises connecting to the RF network via one or more of the available RF communication channels; and providing PNT information to the platform computer.

* * * * *